United States Patent [19]

Haber

[11] 4,023,231
[45] May 17, 1977

[54] OIL DIP STICK WIPER

[76] Inventor: Terry M. Haber, 3050 S. Bristol, No. 8C, Santa Ana, Calif. 92707

[22] Filed: July 26, 1976

[21] Appl. No.: 708,341

[52] U.S. Cl. .............................. 15/210 B; 15/223
[51] Int. Cl.$^2$ ................. F01M 11/12; G01F 15/12; G01F 23/04
[58] Field of Search ......... 15/104.92, 210 B, 218.1, 15/221, 223, 121; 33/126.7 R, 126.7 A

[56] References Cited
UNITED STATES PATENTS 2,439,171   4/1948   Kreider ............................ 15/210 B
2,810,923   10/1957  Desso .............................. 15/210 B Primary Examiner—Daniel Blum
Attorney, Agent, or Firm—Ralph B. Pastoriza

[57] ABSTRACT

The oil dip stick wiper is comprised of a flat base plate which can be secured to the interior of the engine compartment of aircraft, boat or automobile, and a housing structure defining two open, symmetrically aligned "V" s across the top, terminating in a transverse, flexible slotted vane. The flexible slotted vane is surrounded by a slot absorbent pad such that the dip stick can be urged into the slot in the vane and simultaneously be pulled through both edges, or blades, of the vane's slot and the absorbent pad in order to wipe the dip stick clean of excess oil and thereby facilitate accurate measurement of lubricant level fluctuations of the internal combustion engine without the need for external rags, paper towels or sponges.

2 Claims, 3 Drawing Figures

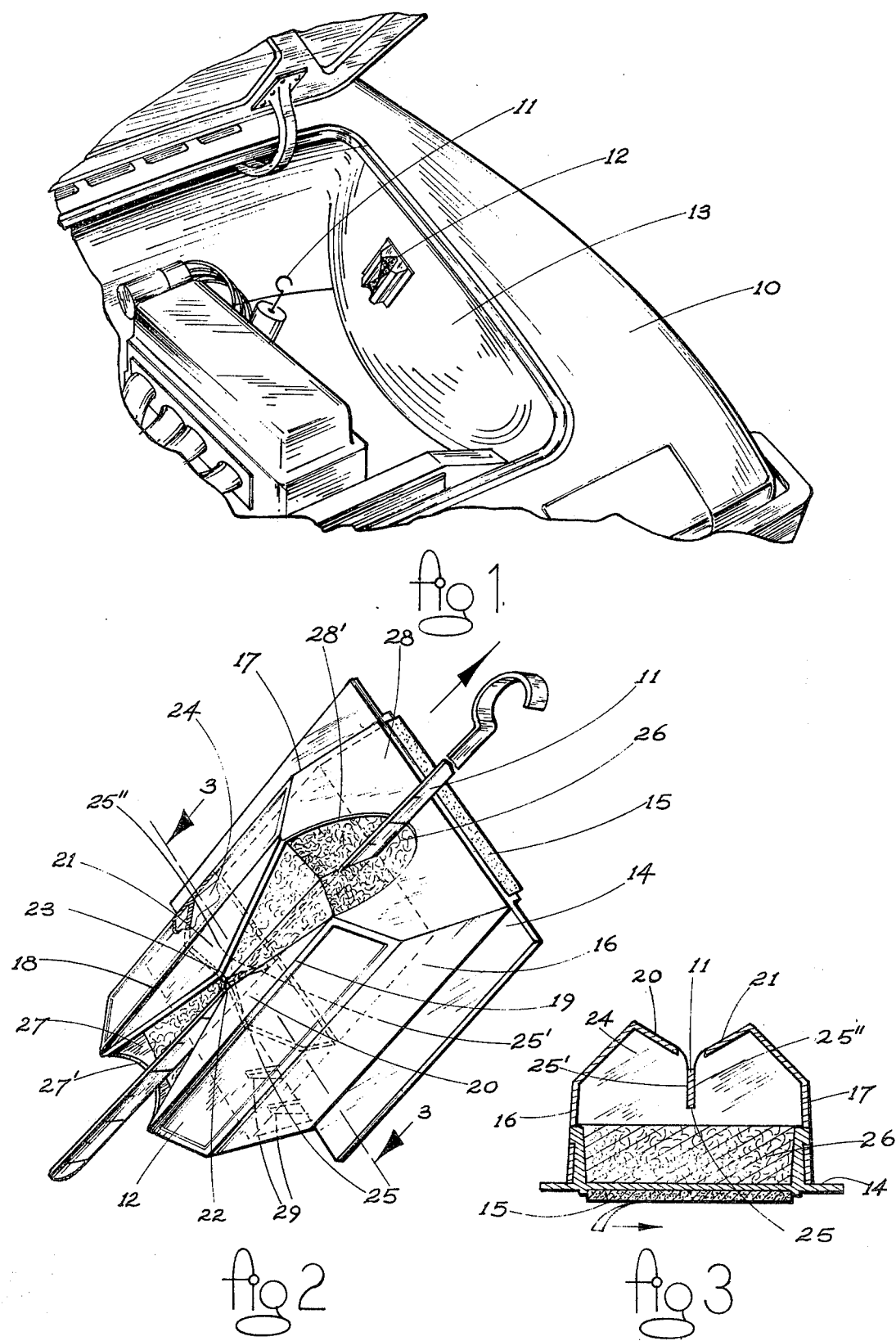

OIL DIP STICK WIPER

This invention relates to an improved wiper for oil dip sticks used in checking the crank case oil level in internal combustion engines.

BACKGROUND OF THE INVENTION

In checking the oil level in internal combustion engines, it is normal practice for the filling station attendant to simply wipe the oil dip stick with any conveniently available rag or towel for the purpose of cleaning the dip stick prior to making a measurement of the oil level. The stick is then re-inserted into the crankcase oil reservoir tube and withdrawn, the oil level being indicated by the length of wet oil clinging onto the stick by capillary action and extending upwards from the tip of the dip stick towards the handle of same.

There are many instances, however, where the owner of an internal combustion powered vehicle may wish to check the oil level for himself, for example, when on long trips to out-of-the-way areas where filling stations may not be convenient or in other instances where the proper maintenance of an aircraft, car or boat engine is a hobby of the owner. In these latter instances, a rag or other suitable wiper is not always conveniently available to wipe the oil from the dip stick and so the owner must resort to using his handkerchief or some other material for wiping the dip stick which must then subsequently be cleaned or alternatively discarded.

BRIEF DESCRIPTION OF THE PRESENT INVENTION

With the foregoing in mind, the present invention contemplates the provision of a compact oil dip stick wiper which can be secured to an inner frame area, bulkhead, or other suitable structural portion of the internal combustion powered vehicle's engine compartment, conveniently adjacent to the dip stick so that it is always available for wiping the dip stick prior to making a measurement of engine oil level.

The wiper itself includes a flat rectangular base supporting a partially open-ended housing on its top surface defined by opposite walls extending upwardly and thence towards each other and finally sloping downwardly and inwardly to terminate in an integral flexible slotted vane, perpendicular to said upwardly extending walls. Absorbent sponge-like material fills the housing and is compressed by and surrounds said flexible slotted vane, the arrangement being such that the dip stick may be urged into the flexible slotted vane above the highest level of oil upon the stick and scraped clean by the opposing interior straight edges of the slot formed within the flexible vane as well as by the oil absorbing sponge-like medium itself. Said absorbent medium completely fills and is contained by the housing, the arrangement being such that the dip stick can be inserted into the symmetrical V-shaped locating channel, urged between the opposing interior edges of the slot contained within the flexible vane and simultaneously scraped clean by said opposing interior straight edges of the flexible slotted vane, as well as by the absorbent medium itself.

Excess oil drawn into the absorbent medium is collected in the lowest portion of the housing and is free to drain off through a matrix of draining passages positioned adjacent to said rectangular base and passing through the lowest point of the bottommost area of the partially opened end of the housing so that the wiper can be used almost indefinitely.

BRIEF DESCRIPTION OF THE DRAWINGS

A better understanding of this invention will be had by referring to the accompanying drawings in which:

FIG. 1 is a fragmentary perspective view of a portion of a typical automobile engine showing the wiper of this invention secured to the frame portion of the automobile adjacent to the engine, for convenient use;

FIG. 2 is an enlarged perspective view of the wiper of FIG. 1 showing the actual wiping of a dip stick; and, FIG. 3 is a cross sectional view taken in the direction of the arrows 3—3 of the exploded view of FIG. 2 but illustrating the respective components in assembled relationship.

DETAILED DESCRIPTION OF THE PREFERRED EMBODIMENT

Referring to FIG. 1, there is shown an automobile 10 with its engine compartment hood in the raised position to expose the normal dip stick 11 utilized to measure engine oil level fluctuations.

The oil dip stick wiper of this invention is designated generally by the numeral 12 and is shown secured to a frame portion 13 of the automobile 10 conveniently close to the oil dip stick 11.

Referring now to FIG. 2, details of the wiper 12 will be evident. Essentially, the wiper comprises a flat rectangular base 14 having means on its bottom surface for securing same to the frame of an automobile. This securing means may constitute a pressure responsive cement or adhesive 15.

A partially open-ended housing is provided on the top surface of the base 14 being defined by opposite walls 16 and 17 extending upwardly from the adjacent opposite side edges.

The walls 16 and 17 then turn inwardly towards each other at 18 and 19 and thence slope downwardly and inwardly as at 20 and 21 to converge at opposite points 22 and 23 adjacent to the integral flexible vane 24. The arrangement is such that the two sloping wall portions 20 and 21 converge to form a symmetrically V-shaped locating channel along the top of the housing. A slot 25 is incorporated into vane 24 comprising opposing interior straight edges 25' and 25".

As shown in FIG. 2 the interior of the housing is filled with a slit absorbent compressible pad 26.

In the preferred embodiment of this invention, end 27 of the housing is notched with a semicircular notch 27' while the opposite end 28 of the housing is notched with an eliptically-shaped locating notch 28'.

A plurality of draining passages 29 are positioned on the lowest edge of side 27 adjacent to the rectangular base. These drain passages allow excess oil wiped from the dip stick 11 and drawn into the absorbent medium 26, to drain through the passages 29 in the lowest housing end 27 into the heated air within the engine compartment 13, whereupon said oil will gradually vaporize.

Referring particularly to the cross sectional view of FIG. 3, it will be noted that when the dip stick 11 is received in the symmetrical V-shaped locating channel defined by the sloping wall portions 20 and 21, the opposing interior straight edge portions 25' and 25" of slot 25 serve as scraping blades to wipe the major portion of the oil from the dip stick when it is simultaneously drawn through the slot 25 and the absorbent pad 26, as indicated by the arrow in FIG. 2. The absorbent pad 26 in turn serves to complete the wiping action to wipe the dip stick clean of oil preparatory to making a measurement of same.

In FIG. 3, the end 27 is shown at the downwardmost position of the housing and it will be noted that the oil scraped by the opposing interior edges of the slot 25 will be drawn into the absorbent pad 26 and flow, under the influence of gravity, downward, to and through the draining passages 29 when the wiper is oriented as shown by way of example in FIGS. 1 and 2.

With each use of the wiper, the initial insertion of the dip stick into slot 25 will exert a tensile force upon the sloping walls which will inturn compress the absorbent pad and thus impart a squeezing pressure upon the oil contained therein. Continued downward pressure within the slot will then force the dip stick to further separate the edges of slot 25, simultaneously being received within the absorbent pad to achieve the complete wiping action. The resulting kneading of the absorbent pad in effecting the wiping action serves to help drain the absorbent medium of excess oil which is collected in the lower internal areas of the wiper so that the dip stick will always be wiped clean and it is not necessary to periodically replace the absorbent pad.

From the foregoing description, it will thus be evident that Applicant has provided an improved oil dip stick wiper which is particularly useful where a filling station is not readily available and an owner wishes to check his own engine oil level.

What is claimed is:

1. An oil dip stick wiper comprising, in combination:
    a. a flat rectangular base having means on its bottom surface for securing it in an inclined position to a selected structural portion of a vehicle adjacent to the internal combustion engine oil dip stick;
    b. a partially open-ended housing defined by opposite walls extending upwardly from the top surface of said flat base adjacent to opposite side edges, said walls thence turning inwardly towards each other and thence sloping downwardly and inwardly to to terminate in on integral transversely oriented, flexible slotted vane, the slot opening at the top of the vane and in which the bottom of said slot is positioned at a given level above the central portion of the top surface of the flat base such that the two sloping wall portions define a symmetrically oriented, "V"-shaped locating channel along the top of said housing; and,
    c. a slit absorbent pad on the top surface of said flat base surrounding the vane, held contained and located by both the walls defining said housing, and by the transversely oriented, flexible slotted vane whereby an oil dip stick can be conveniently wiped clean by pulling an edge through the vertex of said symmetrical, V-shaped locating channel, between the opposed interior edges of said slot in said transversely oriented vane, and drawing the dip stick there-along, the opposite interior straight edges of the slotted area of said vane serving as scrapers to remove a major portion of the oil clinging to the stick, the remaining oil on the stick being wiped off by the walls of the slit of said absorbent pad.

2. The subject matter of claim 1, including a plurality of draining passages positioned adjacent to said rectangular base, and passing through the lower, partially open end of said housing, for the purpose of channeling oil wiped from said dip stick through said draining passages, and into the engine compartment of said vehicle to facilitate vaporization of said oil.

* * * * *